US012577171B2

(12) United States Patent
Zoli et al.

(10) Patent No.: US 12,577,171 B2
(45) Date of Patent: Mar. 17, 2026

(54) PROCESS FOR OBTAINING COMPOSITE, ULTRA-REFRACTORY, FIBRE-REINFORCED CERAMIC MATERIALS

(71) Applicant: CONSIGLIO NAZIONALE DELLE RICERCHE, Rome (IT)

(72) Inventors: Luca Zoli, Ravenna (IT); Diletta Sciti, Imola (IT); Laura Silvestroni, Russi (IT); Antonio Vinci, Faenza (IT)

(73) Assignee: CONSIGLIO NAZIONALE DELLE RICERCHE, Rome (IT)

( * ) Notice: Subject to any disclaimer, the term of this patent is extended or adjusted under 35 U.S.C. 154(b) by 1122 days.

(21) Appl. No.: 17/295,484

(22) PCT Filed: Nov. 20, 2019

(86) PCT No.: PCT/IB2019/059964
§ 371 (c)(1),
(2) Date: May 20, 2021

(87) PCT Pub. No.: WO2020/104959
PCT Pub. Date: May 28, 2020

(65) Prior Publication Data
US 2022/0002208 A1    Jan. 6, 2022

(30) Foreign Application Priority Data
Nov. 20, 2018    (IT) ........................ 102018000010441

(51) Int. Cl.
*C04B 35/80*    (2006.01)
*C04B 35/56*    (2006.01)
(Continued)

(52) U.S. Cl.
CPC .......... *C04B 35/80* (2013.01); *C04B 35/5611* (2013.01); *C04B 35/5622* (2013.01);
(Continued)

(58) Field of Classification Search
CPC ............ C04B 35/80; C04B 2235/3224; C04B 2235/3225; C04B 2235/3227
See application file for complete search history.

(56) References Cited

U.S. PATENT DOCUMENTS

| | | | | |
|---|---|---|---|---|
| 2003/0044593 A1* | 3/2003 | Vaidyanathan | ....... | B29C 64/165 |
| | | | | 428/297.4 |
| 2015/0175487 A1 | 6/2015 | Mendez et al. | | |
| 2019/0283271 A1* | 9/2019 | Tsuru | ...................... | F01D 5/282 |

FOREIGN PATENT DOCUMENTS

| | | | | |
|---|---|---|---|---|
| CA | 2014630 A1 * | 10/1990 | ........... | C04B 35/581 |
| WO | 2017130134 A1 | 8/2017 | | |

OTHER PUBLICATIONS

Yang et al. Mechanical properties of short carbon fiber reinforced ZrB2—SiC ceramic matrix composites. Materials Letters 62 (2008) 2925-2927. (Year: 2008).*

(Continued)

*Primary Examiner* — Erin Snelting
(74) *Attorney, Agent, or Firm* — Silvia Salvadori, P.C.; Silvia Salvadori

(57)    ABSTRACT

The present invention relates to a process for preparing a composite, ultra-refractory, fibre-reinforced ceramic material obtained through the infiltration of carbon and/or silicon carbide fibres with a ceramic suspension comprising yttrium, lanthanum and/or scandium compounds, and the subsequent densification of the composite. The fibre-reinforced UHTC compounds obtained by the process can be used for making items intended for use in extreme temperature and pressure conditions.

17 Claims, 8 Drawing Sheets

(51) Int. Cl.
 C04B 35/58 (2006.01)
 C04B 35/626 (2006.01)

(52) U.S. Cl.
 CPC .. C04B 35/58071 (2013.01); C04B 35/58078 (2013.01); C04B 35/6263 (2013.01); *C04B 2235/3225* (2013.01); *C04B 2235/3227* (2013.01); *C04B 2235/3813* (2013.01); *C04B 2235/3826* (2013.01); *C04B 2235/3839* (2013.01); *C04B 2235/3843* (2013.01); *C04B 2235/3891* (2013.01); *C04B 2235/5244* (2013.01); *C04B 2235/5248* (2013.01); *C04B 2235/526* (2013.01); *C04B 2235/5264* (2013.01); *C04B 2235/5445* (2013.01); *C04B 2235/5454* (2013.01); *C04B 2235/602* (2013.01); *C04B 2235/616* (2013.01); *C04B 2235/656* (2013.01); *C04B 2235/77* (2013.01); *C04B 2235/96* (2013.01); *C04B 2237/36* (2013.01); *C04B 2237/38* (2013.01)

(56) References Cited

OTHER PUBLICATIONS

Sciti D., et al., "Ultra-high temperature ceramics: materials for extreme environment applications, first edition. Edited by Sintering and densification Mechanisms of Ultra-high temperature ceramics introduction", In "Ultra-High Temperature Ceramics", Jan. 1, 2014, pp. 112-143.

Guo W M. et al, "Effects of Re203 (Re=La, Nd, Y and Yb) addition in hot-pressed ZrB2—SiC ceramics", Journal of European Ceramic Society, vol. 29, No. 14, Nov. 1, 2009, pp. 3063-3068.

Search Report and Written Opinion of PCT/IB2019/059964 of Feb. 20, 2020.

Zapata-Solvas E., et al., "Mechanical properties of ZrB20 and HfB2-based ultra-high temperature ceramics fabricated by spark plasma sintering", Journal of European Ceramic Society, vol. 33, No. 7, Feb. 8, 2013, pp. 1373-1386.

Zoli L. et al., "Rapid spark plasma sintering to produce dense UHTCs reinforced with undamaged carbon fibres", Materials & Design, vol. 130, May 10, 2017, pp. 1-7.

* cited by examiner

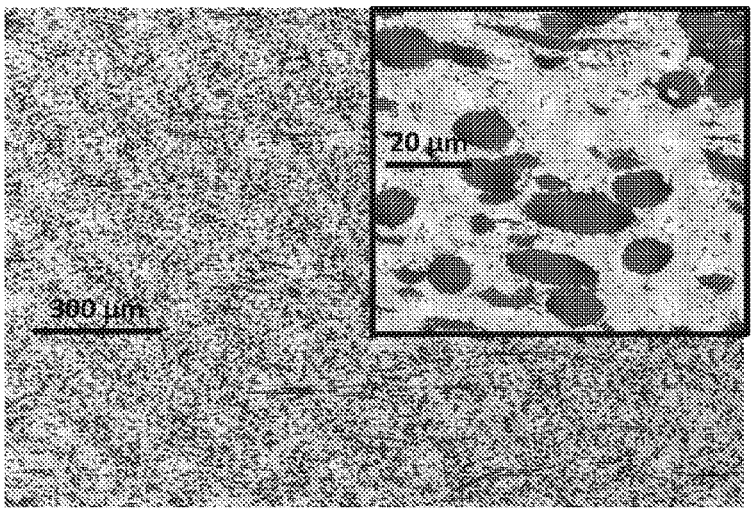
FIG. 1a
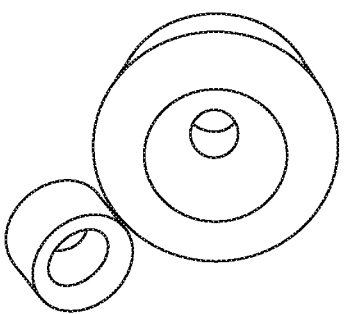 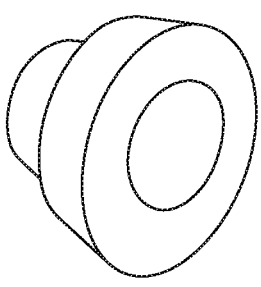 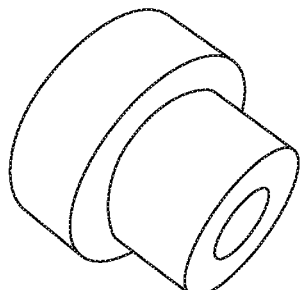
FIG. 1b          FIG. 1c          FIG. 1d

PROCESS FOR OBTAINING COMPOSITE, ULTRA-REFRACTORY, FIBRE-REINFORCED CERAMIC MATERIALS

This application is a U.S. national stage of PCT/IB2019/059964 filed on 20 Nov. 2019 which claims priority to and the benefit of Italian patent application No. 102018000010441 filed on 20 Nov. 2018, the content of which are incorporated herein by reference in their entireties.

DESCRIPTION

The present invention relates to a process for preparing a composite, ultra-refractory, fibre-reinforced ceramic material.

PRIOR ART

In the aerospace industry, there is a growing demand for advanced ceramic materials capable of withstanding temperatures above 2000° C. in highly abrasive, oxidising and corrosive environments.

The combination of extreme temperatures, rapid heating/cooling cycles and chemically aggressive environments are in fact conditions that go beyond the capacity of traditional materials.

C/SiC and SiC/SiC composites are presently among the most promising materials for applications in these fields, for which the feasibility of the various parts of aeronautic engines, parts of valves for hot gases and thermal protection systems has already been demonstrated. Up to now, the materials for use in extreme environments such as the ones indicated above have largely been limited to ceramic phases based on silicon carbide, which is capable of forming, by oxidation, a protective surface $SiO_2$ film. However, although $SiO_2$ provides an excellent barrier to oxidation at temperatures below 1600° C. and in oxygen-rich atmospheres, beyond this temperature it begins to soften and in an oxygen-poor atmosphere it provokes a substantial formation of vapours.

For this reason, in recent years, ultra-refractory ceramic materials such as $ZrB_2$, $HfB_2$, ZrC, HfC and TaC have been broadly studied as innovative thermal protection systems, and, more in general, for applications in which resistance to oxidation and/or erosion at extreme temperatures is necessary. The category of ultra-refractory ceramic materials (UHTCs) comprises compounds with melting temperatures over 3000° C., which have high resistance to fracture even at high temperatures.

UHTC ceramic inserts have been tested on scale prototypes of rocket engines, confirming that high temperature erosion resistance is an extremely important property for materials that must be used for these applications.

However, these tests have demonstrated that, in the absence of suitable thermal shock resistance and resistance to the propagation of cracks, the chemical, physical and mechanical properties of UHTCs are not sufficient to be able to guarantee reliability for components made with such materials.

One way to overcome the problems of the fragility of ultra-refractory ceramic materials is to supplement the ultra-refractory ceramic phase with both continuous and discontinuous reinforcement elements.

Composite materials have been developed and tested which have been produced through the following process steps: infiltrating carbon preforms with suspensions (slurries) of various ultra-refractory ceramics, drying and consolidation through sintering. There are three industrial processes for producing composite materials with a ceramic matrix reinforced with carbon or silicon carbide fibres: chemical vapour infiltration (CVI), Polymer Infiltration and Pyrolysis (PIP) and Reactive melt infiltration (RMI).

CVI allows the open porosity of the preform to be closed through the growth of ceramic material obtained by the decomposition of a precursor in the vapour phase (e.g. methane that decomposes to carbon and an organosilane that decomposes to SiC).

PIP exploits the infiltration process of preforms using liquid polymers (e.g. phenol resins and polycarbosilanes) and their conversion to ceramic phases (C and SiC), repeating this infiltration cycle and pyrolysis until closure of the open porosity.

However, the infiltration and densification of the material by means of the processes seen above show some limits, first of all the high cost of the processes and of the precursors of the ceramic phases, and the lengthy production times.

RMI is a technique that exploits the infiltration of the preform with a molten metal and its conversion into the ceramic phase by reaction with a non-metallic sacrificial phase present in the preform. The best known example is Liquid Silicon Infiltration (LSI), which exploits infiltration with liquid silicon and its reaction with sacrificial carbon previously added to a preform through PIP. This process produces a dense material containing an unreacted metal fraction, which therefore limits the operating temperature.

Hybrid methods have also been developed for the production of UHTC composites have been developed, in particular with the use of $ZrB_2$-based matrices, which couple the technique of slurry infiltration with vacuum-bagging of carbon fibres, typical of the production of polymer-matrix composite materials, with a sintering process typical of ceramic materials (D. Sciti et al., Materials and Design, 85 (2015) 127-134). Such methods allow composites to be made with a carbon fibre content up to 70% and good densification of the ultra-refractory matrix as described, for example, in patent application WO2017/130134.

An analogous hybrid method has been used for the production of UHTC composites with a $ZrB_2$-based matrix, reinforced with silicon carbide fibres (L. Zoli et al., J Eur Ceram Soc (2015), 35, 16, 4371-4376).

Despite the porosity of the UHTCs obtained with the methods reported above being rather reduced, there is still a strongly felt need in the sector to have composite, ultra-refractory ceramic materials available with low porosity and high toughness, which have a suitable interface between fibre and matrix able to fully exploit the mechanical properties of both. A critical parameter in the production of UHTC composites is the creation of a suitable fibre/matrix interface that allows the transfer of the load from the fragile matrix to the resistant fibre. In the attempt to completely eliminate the porosity, the material is generally processed at sintering temperatures of over 1900° C. and in the presence of mechanical pressure, but exposure also for times in the order of minutes implies a drastic modification of the fibre with consequent loss of the mechanical properties, as described in (L. Zoli et al., Materials & Design (2017), 130, 1-7)

In this context, the present invention therefore sets out to solve the main task of proposing a ceramic suspension that can be used as a matrix for producing a composite, ultra-refractory ceramic material with high toughness and low residual porosity.

Another object of the invention is that of providing a process for preparing a composite, ultra-refractory ceramic material using said ceramic suspension, which is simple, quick, reproducible and economically viable to make.

SUMMARY OF THE INVENTION

The present invention relates to a process for preparing a composite, ultra-refractory, fibre-reinforced ceramic material comprising:

(i) infiltrating a plurality of fibres selected from carbon fibres, silicon carbide fibres and mixtures thereof, with a ceramic suspension, thereby obtaining an infiltrated composite material, and drying the infiltrated composite material, wherein the ceramic suspension comprises:

(A) a mixture of solid ceramic phases comprising:

(a) an amount greater than or equal to 55 vol. % of an ultra-refractory ceramic component selected from the group consisting of $ZrB_2$, $HfB_2$, $TaB_2$, $TiB_2$, $NbB_2$, ZrC, HfC, TiC, NbC, TaC and mixtures thereof;

(b) 0-30 vol. % of SiC;

(c) 0.1-15 vol. % of at least one compound selected from the group consisting of scandium, yttrium, lanthanum compounds and mixtures thereof; and (B) a dispersant selected from the group consisting of water, organic solvents, liquid organic precursors of SiC, liquid organic precursors of carbon and mixtures thereof, and (ii) consolidating the dried composite material at a temperature comprised in the range of 1700°-2000° C.

The invention also relates to a composite, fibre-reinforced UHTC material obtainable by the process, wherein said material has a density less than or equal to 4 g/cm$^3$ and/or fracture toughness greater than or equal to 4 MPa·m$^{1/2}$.

The invention further relates to a ceramic suspension comprising:

(A) a mixture of solid ceramic phases comprising:

(a) an amount greater than or equal to 55 vol. % of an ultra-refractory ceramic component selected from the group consisting of $ZrB_2$, $HfB_2$, $TaB_2$, $TiB_2$, $NbB_2$, ZrC, HfC, TiC, NbC, TaC and mixtures thereof;

(b) 0-30 vol. % of SiC;

(c) 0.1-15 vol. % of at least one compound selected from the group consisting of scandium, yttrium, lanthanum compounds and mixtures thereof; and (B) a dispersant selected from the group consisting of water, organic solvents, liquid organic precursors of SiC, liquid organic precursors of carbon and mixtures thereof.

DESCRIPTION OF THE FIGURES

FIG. 1a shows an image under the microscope of the UHTC composite reinforced with short fibres obtained in example 1. FIGS. 1b, 1c and 1d illustrate some items made with such UHTC composite.

DETAILED DESCRIPTION OF THE INVENTION

Figure 2:
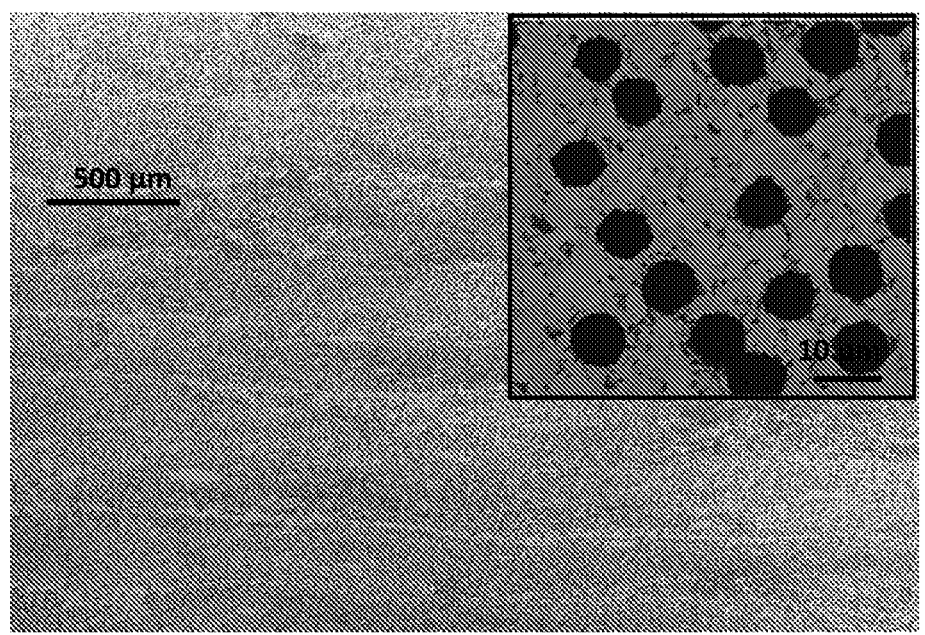
FIG. 2 shows an image under the microscope of the UHTC composite reinforced with long fibres obtained with hand lay-up in example 4.

In the present description and appended claims the acronym "UHTC" (Ultra-High Temperature Ceramic) relates to ultra-refractory ceramic materials with melting temperatures greater than or equal to 3000° C. Likewise, the expression "fibre-reinforced UHTC composites" (hereinafter also "composites") relates to ultra-refractory composite ceramic materials comprising fibres.

"Ceramic suspension" means a dispersion of solid particles in a liquid, which is stable at ambient temperature.

In the context of the present invention, "demineralized water" means water with conductivity less than 10 μS/cm.

In the context of the present invention, the term "preform" relates to a plurality of fibres arranged to constitute a three-dimensional structure. The preform can have an ordered or disordered arrangement of the fibres, i.e. random, such as felt, in which the fibres are oriented casually.

Preforms with an ordered arrangement of fibres comprise preforms having a substantially linear extension i.e. "1D preform", such as monofilaments, tows, yarns and rovings; preforms having a substantially planar extension in two dimensions, such as "UD preforms" comprising at least one layer of fibres arranged parallel to one another and "2D preforms" comprising two-dimensional interwoven fibres with a warp and weft structure and preforms having a multidimensional extension such as "2.5D or 3D preforms". In a first aspect thereof, the present invention relates to a process for preparing a composite, ultra-refractory, fibre-reinforced ceramic material comprising:

(i) infiltrating a plurality of fibres selected from carbon fibres, silicon carbide fibres and combinations thereof, with a ceramic suspension, thereby obtaining an infiltrated composite material, and drying the infiltrated composite material, wherein the ceramic suspension comprises:

(A) a mixture of solid ceramic phases comprising:

(a) an amount greater than or equal to 55 vol. % of an ultra-refractory ceramic component selected from the group consisting of $ZrB_2$, $HfB_2$, $TaB_2$, $TiB_2$, $NbB_2$, ZrC, HfC, TiC, NbC, TaC and mixtures thereof;

(b) about 0-30 vol. % of SiC;

(c) about 0.1-15 vol. % of at least one compound selected from the group consisting of scandium, yttrium, lanthanum compounds and mixtures thereof; and (B) a dispersant selected from the group consisting of water, organic solvents, liquid organic precursors of SiC, liquid organic precursors of carbon and mixtures thereof, (ii) consolidating the dried composite material at a temperature comprised in the range of 1700°-2000° C.

In the mixture (A) the volumetric quantity of (a), (b) and (c) refers to the sum of the volumes (a)+(b)+(c), such sum being equal to 100%.

The fibres of step (i) may be carbon fibres.

According to a variant, the fibres, preferably but not exclusively, made of carbon, may have a Young modulus greater than or equal to 250 GPa, preferably greater than or equal to 300 GPa (high modulus fibres), more preferably greater than or equal to 600 GPa (ultra-high modulus fibres).

Optionally, the fibres may be covered by a protective coating, preferably made of carbon. Advantageously, such covered fibres have a better interface with the matrix with respect to the same uncovered fibres, improving the toughness of the reinforced UHTC composite.

The fibres, preferably but not exclusively made of carbon, may have a diameter of about 5-20 μm, preferably of about 10 μm.

The process can be used for producing UHTC composites reinforced with short fibres, in which fibres having a length of about 25-6000 μm are dispersed in an isotropic ceramic matrix (composites with discontinuous reinforcement).

Alternatively, the process can be used for producing UHTC reinforced with long fibres, i.e. composites in which the fibres have a length greater than or equal to about 6000 μm and, preferably, they may be ordered and oriented within the isotropic ceramic matrix (composites with continuous reinforcement).

In one embodiment, the ceramic suspension can comprise:

(A) a mixture of solid ceramic phases comprising:
(a) about 55-96 vol. %, preferably about 80-95 vol. %, of an ultra-refractory ceramic component selected from the group consisting of $ZrB_2$, $HfB_2$, $TaB_2$, $TiB_2$, $NbB_2$, ZrC, HfC, TiC, NbC, TaC and mixtures thereof;
(b) about 2-30 vol. % of SiC, preferably about 3-15 vol. %;
(c) about 0.1-15 vol. %, preferably about 2-15 vol. % of at least one compound selected from the group consisting of scandium, yttrium, lanthanum compounds and mixtures thereof; and (B) a dispersant selected from the group consisting of water, organic solvents, liquid organic precursors of SiC, liquid organic precursors of carbon and mixtures thereof.

In the mixture (A) the volumetric quantity of (a), (b) and (c) refers to the sum of the volumes (a)+(b)+(c), such sum being equal to 100%.

In a further embodiment, the ceramic suspension does not comprise component (b), i.e. solid SiC. According to such embodiment, the ceramic suspension can comprise:

(A) a mixture of solid ceramic phases comprising:
(a) about 85-98 vol. % of an ultra-refractory ceramic component selected from the group consisting of $ZrB_2$, $HfB_2$, $TaB_2$, $TiB_2$, $NbB_2$, ZrC, HfC, TiC, NbC, TaC and mixtures thereof; and
(c) about 2-15 vol. % of at least one compound selected from the group consisting of scandium, yttrium, lanthanum compounds and mixtures thereof; and (B) a dispersant selected from the group consisting of liquid organic precursors of SiC, liquid organic precursors of carbon and mixtures thereof.

The volumetric quantity of (a) and (c) refers to the sum of the volumes (a)+(c), such sum being equal to 100%.

In the ceramic suspensions described above the ultra-refractory component (a) of mixture (A) can be selected from the group comprising $ZrB_2$, $HfB_2$, $TaB_2$, ZrC, HfC, TaC and mixtures thereof, more preferably it may be $ZrB_2$.

Said ultra-refractory ceramic component may be a powder having particle size less than or equal to about 6.0 μm, preferably comprised within the interval of about 0.2-6.0 μm. According to a preferred embodiment, the ultra-refractory ceramic component (a) can comprise about 70-90 vol. % of particles having a size less than or equal to about 6.0 μm, preferably having a size comprised in the range of about 0.2-6.0 μm, and about 10-30 vol. % of the particles with size less than or equal to about 500 nm.

The mixture (A) can comprise SiC powder as component (b), wherein said powder can have sub-micrometric dimensions, preferably less than or equal to about 500 nm, such dimensions preferably being comprised within the range of about 50-250 nm.

The mixture (A) can comprise about 0.1-15 vol. %, more preferably about 2-12 vol. %, more preferably about 3-10 vol. %, of component (c).

The component (c) of mixture (A) can preferably be selected from the group consisting of oxides, borides and hydrides of at least one element selected from the group consisting of scandium, yttrium, lanthanum and mixtures thereof; preferably, component (c) can be selected from the group consisting of the oxides of at least one element selected from the group consisting of scandium, yttrium, lanthanum and mixtures thereof, more preferably, the component (c) may be yttrium oxide.

The present patent application discloses that the presence of yttrium, lanthanum and scandium compounds, particularly but not exclusively the compounds indicated above, in the ceramic suspension has the effect of densifying the ceramic matrix without depressing the mechanical characteristics of the composite material. In particular, it has been observed that said compounds form liquid phases that promote sintering and reinforce the ceramic matrix without compromising the fibre/matrix interface, therefore not making it necessary to protect the fibre through a sacrificial coating, with the consequent economic savings on the process.

Thanks to the presence of component (c), the fibre-reinforced UHTC compounds according to the present invention have lower residual porosity, higher flexural strength and fracture toughness, in particular at high temperatures.

Furthermore, compound (c) allows the aforementioned effects to be obtained and at the same time the sintering times of the UHTC composite materials described herein to be reduced.

The dispersant (B) may be at least one organic solvent selected from the group consisting of ketones, alcohols, ethers and mixtures thereof, preferably it can be selected from methyl ethyl ketone, ethanol and mixtures thereof.

In a preferred embodiment from the ecological and industrial hygiene point of view, the dispersant (B) may be demineralized water.

Furthermore, the dispersant (B) may be at least one liquid organic precursor of SiC. Such organic compounds comprise Si, are liquid at temperatures of 25°±2° C. and are able to develop a ceramic phase of SiC during the sintering of the fibre-reinforced UHTC composite. The organic precursors of SiC can be selected from among polycarbosilanes, polysilazanes and mixtures thereof.

The dispersant (B) may further be at least one liquid organic precursor of carbon. Such compounds are liquid at temperatures of 25°±2° C. and are able to develop a turbostratic carbon or graphite phase during the sintering of the fibre-reinforced UHTC composite.

The organic precursors of C can be selected from phenol resins, acrylic resins, epoxy resins, unsaturated polyester resins and mixtures thereof.

Optionally, the mixture (A) as described above can further comprise at least one functionalizing agent (d) for increasing the resistance to oxidation of the fibre-reinforced UHTC composite. The quantity of functionalizing agent (d) in the mixture (A) may be about 1-20 vol. %, preferably about 1-10 vol. %, more preferably about 1-5 vol. %, said functionalizing agent being selected in the group consisting of borides, carbides and silicides of at least one element selected from the group consisting of W, Re, Ir, Mo, Cr and mixtures thereof.

According to this embodiment, in the mixture (A) the volumetric quantity of (a), (b), (c) and (d) refers to the sum of the volumes (a)+(b)+(c)+(d), such sum being equal to 100 vol. %.

In one embodiment, the mixture (A) can comprise tungsten carbide as a functionalizing agent (d) in quantities of less than or equal to about 20 vol. %, preferably less than or equal to 10 vol. %, more preferably the quantity can be comprised in the range of about 1-5 vol. %, even more preferably in the range of about 2-5 vol. %.

The ceramic suspension can comprise high loads of solid, and is presented as a homogeneous slurry, without any deposit or sediment.

Preferably, the ceramic suspension can comprise about 20-50 vol. % of the mixture (A) of solid ceramic phases and about 50-80 vol. % of at least one dispersant (B), in which the volumetric quantities of (A) and (B) refer to the total volume (A)+(B).

To optimize the rheological characteristics, the ceramic suspension, preferably but not exclusively comprising demineralized water as the dispersant, can further comprise at least one additive selected from polycarboxylates, ammonium salts, polyalcohols having a molecular weight comprised between 500 and 16000 Da and mixtures thereof. The total quantity of additive in the ceramic suspension can be less than or equal to about 10% by weight, preferably comprised in the range of about 0.1-5% by weight, wherein the percentage refers to the total weight of the ceramic suspension.

In order to further optimize the rheology, the pH of a ceramic suspension comprising demineralized water as the dispersant can be adjusted by adding suitable pH adjusters, preferably selected from among organic and inorganic mono- or di-protic acids, ammonia and metal hydroxides.

The ceramic suspension can be prepared by pre-mixing the powders of the mixture (A) in a ball mill using a volatile organic solvent, e.g. ethanol. The mixture (A) can be homogenized for at least 8 hours and subsequently dried (for example in a rotary evaporator) and sieved. The powders can be suspended in the dispersant (B), optionally in the presence of other appropriate components indicated above.

Alternatively, the mixture (A) of solid ceramic phases can be mixed with the dispersant (B) and any additives in a ball mill for about 8 hours.

In step (i) a plurality of fibres can be infiltrated with the ceramic suspension described above using different infiltration techniques.

To obtain UHTC composites reinforced with short fibres, step (i) can comprise at least one step of forming the infiltrated composite material. According to one embodiment, step (i) of the process for obtaining UHTC composites reinforced with short fibres can comprise the sub-steps of:

(i.a1) dispersing a plurality of fibres having a length of about 25-6000 μm in the ceramic suspension and grinding the dispersion, obtaining an infiltrated composite material; and (i.b1) forming and drying the infiltrated composite material with a forming method selected from the group consisting of spray application, slip casting, tape casting and pressing.

The grinding can take place in a mill comprising grinding bodies of the type normally used in the ceramic sector.

In spray application, the infiltrated composite material is applied within a mould by means of a pressurized jet.

In slip casting, the infiltrated composite material is poured into a mould. Optionally, the mould can be made of porous material, typically gypsum. In that way, the dispersant (B), preferably, but not exclusively, demineralized water, can be removed from the infiltrated composite material due to the capillary action exercised by the porous mould, obtaining greater compacting of the solid ceramic phase comprised into the composite material matrix.

In tape casting, the infiltrated composite material is poured onto a continuous tape. When the infiltrated composite material is formed through spray application, slip casting or tape casting, forming precedes drying.

When the infiltrated composite material is formed through pressing, drying precedes forming. According to this embodiment, the infiltrated composite material can be dried, e.g. in a rotary dryer normally used in the sector for that purpose, obtaining a dried infiltrated composite material. The dried infiltrated composite material can optionally but preferably be ground and sieved, and subsequently formed by uniaxial or isostatic pressing.

In a further embodiment, to obtain UHTC composites reinforced with long fibres, step (i) of the process can comprise:

(i.a2) infiltrating at least one preform comprising a plurality of fibres having a length greater than 6000 μm with the ceramic suspension with a method selected from hand lay-up, dip coating and filament winding, obtaining an infiltrated composite material; and (i.b2) drying the infiltrated composite material.

In the hand lay-up method, the at least one preform can be selected from the group consisting of UD preforms, interwoven 2D preforms, random 2D preforms, 2.5D preforms, 3D preforms and combinations thereof, preferably there may be at least one UD preform. In dip coating and filament winding, the at least one preform having a substantially linear extension, such as monofilament, tow, yarn, and roving, is dipped into a bath comprising the ceramic suspension, which penetrates between the fibres filling the empty spaces between them.

Using the filament winding method, after dipping into the ceramic suspension, the long threads comprising a plurality of fibres are wound onto a spool, obtaining a hollow cylinder-shaped infiltrated composite material. Optionally, and preferably, the infiltrated composite material can be cut and spread out to obtain a substantially planar infiltrated composite.

The drying step (i.b2) for obtaining UHTC composites reinforced with long fibres can comprise drying the infiltrated composite material in air or in a protected atmosphere. In a further embodiment, the infiltrated composite material can be vacuum dried, e.g. vacuum bagging, through the use of a rotary vacuum pump.

Step (i.b1) or (i.b2) can be performed at ambient temperature, i.e. about 25°±2° C. or at a temperature greater than ambient temperature for speeding up the drying process.

Step (i.a) and/or step (i.b) can further, and preferably, comprise superposing the infiltrated composite material.

For example, and without any limitations, the UD preforms can be superposed with a fibre orientation angle comprised between 0° and 90° with respect to the orientation direction of the fibres of the immediately previous preform (e.g.) 0°/+45°/90°/−45°/0°. Alternatively, the UD preforms can be superposed keeping the orientation of the fibres parallel (0°/0° configuration), or by orienting the fibres of each preform alternatively by 90° with respect to the orientation of the fibres of the immediately previous preform (0°/90°/0° configuration).

During step (ii) of the process, the composite material is consolidated at temperatures comprised between 1400° C. and 2000° C., preferably about 1700°-2000° C., more preferably about 1800°-1950° C. In this way the ceramic matrix is sintered and densified.

Step (ii) can be performed at a pressure comprised between about 101.32 kPa and about 60 MPa, preferably about 1-40 MPa.

Step (ii) can comprise consolidating the dried composite material by heating the material to the temperatures reported above using electrical resistors, by induction or by the Joule effect, optionally under mechanical or gas pressure.

Step (ii) can comprise consolidating the dried composite material by hot pressing or plasma sintering.

According to one embodiment, step (ii) can comprise subjecting the dried composite material to at least one hot pressing cycle, by applying a pressure comprised between 1 and 40 MPa at a temperature of about 1400°-2000° C., preferably about 1700°-2000° C., more preferably about 1800°-1950° C.

The hot pressing can take place under vacuum or in an inert atmosphere, e.g. in the presence of Ar, to prevent the formation of surface oxides which can compromise the physical/mechanical characteristics of the fibre-reinforced UHTC composite material.

In one embodiment, step (ii) can comprise a first hot pressing cycle and at least a second hot pressing cycle, wherein the at least one hot pressing cycle comprises superposing the consolidated composite UHTC material obtained from the first pressing cycle with a consolidated composite UHTC material obtained from the first pressing cycle and/or with a dried infiltrated composite material obtained from step (i).

The at least one second hot pressing cycle can be performed in the conditions reported above.

Advantageously, according to this embodiment, the adhesion between the superposed layers is promoted by the presence of component (c) in the mixture (A) of ceramic phases and it is therefore possible to make large items with a variable composition.

At the end of step (ii) of the process, the fibre-reinforced UHTC composite material can comprise about 30-70 vol. % of fibres, preferably about 40-60 vol. %, more preferably about 45-55 vol. %, wherein the percentage relates to the volume of fibres with respect to the total volume of the composite. Such percentage of fibres allows the fibre-reinforced UHTC composite material obtained with the process described, i.e. the consolidated composite material, to have high flexural strength and high fracture toughness.

The fibre-reinforced UHTC composite material can have a variable thickness, generally greater than or equal to about 2 mm.

The process described allows fibre-reinforced UHTC composite materials to be obtained in a simple, quick and economically advantageous way.

Furthermore, thanks to the optimization of the properties and the composition of the ceramic suspension, in particular thanks to the presence of the compound (c) in the mixture (A) of ceramic phases, the fibre-reinforced UHTC composite material obtainable by the process has particularly advantageous characteristics in terms of matrix densification, flexural strength, fracture toughness and oxidation resistance.

The very low residual porosity in the ceramic matrix significantly reduces the vulnerability of the fibre-reinforced UHTC composite, making it slightly more resistant to oxidation, abrasion and erosion at high temperatures with respect to the fibre-reinforced UHTC composite materials known in the state of the art.

The greater sinterability of the mixture (A) of ceramic phases allows the pressure applied during step (ii) of consolidating composite material to processes known in the state of the art to be reduced, obtaining a fibre-reinforced UHTC composite material having final density and porosity comparable to fibre-reinforced UHTC composites known in the state of the art.

The improved sinterability of the mixture (A) of ceramic phases further allows the same level of porosity of the fibre-reinforced UHTC composite to be obtained using a lower consolidation temperature with respect to the state of the art.

In a further aspect thereof, the present invention relates to an ultra-refractory composite ceramic material obtained or obtainable from the above-described process.

Said fibre-reinforced UHTC composite material can have at least one of the following properties, preferably all of the following properties:

density less than or equal to 4 g/cm$^3$; and/or fracture toughness greater than or equal to 4 MPa·m$^{1/2}$.

UHTC composites reinforced with short fibres can have at least one or more of the following properties, preferably all of the following properties:

flexural strength at 25°±2° C. greater than 150 MPa;

flexural strength at 1500° C. in a reducing atmosphere greater than 200 MPa;

thermal shock resistance greater than 1000° C.

UHTC composites reinforced with long fibres can have at least one or more of the following properties, preferably all of the following properties:

flexural strength at 25°±2° C. greater than 400 MPa for composites with 0°/0° orientation of the preforms;

flexural strength at 1500° C. in a reducing atmosphere greater than 500 MPa for composites with 0°/0° orientation of the preforms;

thermal shock resistance greater than 1000° C. for composites with 0°/0° orientation or 0°/90° of preforms;

Further subject matter of the present invention relates to the use of the fibre-reinforced UHTC composite material described above for making items intended for use at temperatures greater than or equal to 1600° C.

Further subject matter of the present invention is therefore an item for use at temperatures greater than or equal to 1600° C. comprising said fibre-reinforced UHTC composite material, such as for example components for use in the aerospace field, e.g. inserts for nozzles for rockets, tiles for thermal protections and wingtips.

As the superior physical/mechanical properties of the fibre-reinforced UHTC composite material obtained by the process according to the invention are due to the presence of component (c) in the mixture (A) of solid ceramic phases, further subject matter of the present invention is a ceramic suspension as described above and the use thereof for increasing the toughness and density of the ceramic matrix of a composite ultra-refractory ceramic material reinforced with carbon and/or silicon carbide fibres as described above. Furthermore, the invention relates to the use of at least one compound selected from the group consisting of scandium, yttrium and lanthanum compounds, and mixtures thereof, preferably of at least one compound selected in the group consisting of oxides, borides, borates and hydrides of at least one element selected in the group consisting of scandium, yttrium and lanthanum, and mixtures thereof, more preferably at least one oxide of an element selected in the group consisting of scandium, yttrium, lanthanum and mixtures thereof, even more preferably the use of yttrium oxide, for increasing the toughness and density of the ceramic matrix of a composite ultra-refractory ceramic material reinforced with carbon and/or silicon carbide fibres, wherein said ceramic matrix is preferably obtained from a ceramic suspension as described above, more preferably it is obtained from a process as described above.

Measurement Methods:

Particle size: X-ray sedimentography.

Dynamic viscosity: rotational rheometry.

Porosity: mercury intrusion porosimetry.

Flexural strength: 4-point method according to standard EN 843-1.

Elastic modulus: resonance frequency method according to standard ASTM-E1875-08.

Toughness: Chevron Notched Beam method in bending, according to standard EN 14425-3.

Oxidation resistance: Melting furnace 1800° C. Nannetti, mod. FC-0311281.

Test piece weight: Gibertini balance mod. PSS.

Erosion rate: the erosion rate is measured with an ablation test using plasma (arc jet) by a mixture of high-velocity gas containing methane, oxygen and air, under the following flow conditions:

total pressure of the chamber: 9.8 bar;

maximum temperature: 2900 K;

oxidising gas velocity: 40 g/s;

fuel velocity: 6.6 g/s;

Mach number ~2.5;

torch nozzle diameter: 9.6 mm;

duration of experiment: 10 s.

Thermal shock resistance: the thermal shock resistance (TSR) was determined following standard EN 820-3:2004, through the residual resistance method after cooling in water on 25×2.5×2.0 mm³ bars (length×width×height) with smoothed long edges. The bars are placed inside a vertical tubular furnace and brought to the final temperature. After being kept at the temperature for about 10 minutes, the samples are dropped into a water bath at ambient temperature. The 4-point resistance is measured in the same machine and with the same flexural mechanical strength method at ambient temperature. The "critical thermal shock resistance" (CTSR) is the temperature of the heat difference that determines a reduction of over 30% of the average resistance value of samples that do not undergo a significant heat change.

The present invention is illustrated below by means of some examples that have a non-limiting illustrative purpose.

Example 1—UHTC Reinforced with Short Fibres 45 g of a ceramic mixture (A) having the composition reporting below were prepared:

(a) 90 vol. % $ZrB_2$ (H. C. Starck, grade B, particle size 0.5-6 μm);

(b) 5 vol. % SiC (H. C. Starck, grade UF25, particle size <0.76 μm); and (c) 5 vol. % $Y_2O_3$ (H. C. Starck, particle size 0.6-0.9 μm, purity >99.95%);

The ceramic suspension was prepared by mixing in a ball mill the solid raw materials with 45 g of ethyl alcohol for 2 h. Subsequently, short carbon fibres (Nippon Graphite Fiber Corporation, XN-C60-03S) were added, in the proportion of 45% by volume with respect to the solid of the ceramic suspension and about 200 ml of ethyl alcohol. The mixture thus prepared was also mixed in a ball mill for 22 h.

The drying took place using a rotary evaporator at 80° C.

The agglomerates contained in the dry mixture obtained were disaggregated and everything was poured into a steel mould of 30 mm diameter by applying linear pressure of 20 MPa.

The composite material was consolidated by means of hot-pressing at 1900° C. at a pressure of 40 MPa, bringing the sample from 900° C. at 1900° C. in 1 hour, with a dwell time of 30 min. and free descent.

The microstructure of the material was dense and without macro-defects, with the non-agglomerated fibres and uniformly distributed in the ceramic phase, as FIG. 1a highlights.

The results of the tests performed on the composite UHTC material obtained are reported in the following table.

TABLE 1

| Porosity | vol % | 0.5 |
|---|---|---|
| Fibre volume | vol % | 45 |
| Flexural strength at amb. T | MPa | 147 ± 5 |
| Flexural strength at 1500° C., Ar | MPa | 218 ± 35 |
| Fracture toughness at amb. T | MPa m$^{0.5}$ | 4.10 ± 0.14 |
| Fracture toughness at 1500° C., Ar | MPa m$^{0.5}$ | 6.60 ± 0.69 |

The composite material was processed in a hollow cylinder and subjected to the hot erosion test. As a result of the erosion test, the throat of the nozzle produced in the material obtained in example 1 did not undergo any appreciable erosion following exposure to the gas flow. The internal diameter of the nozzle before the erosion test was 9.72 mm and after the erosion test it was 9.73 mm.

Using the UHTC composite reinforced with short fibres it was possible to obtain items with complex shapes, such as grooves of rockets or nozzles, as reported in FIGS. 1d-1d.

Example 2—UHTC Reinforced with Short Fibres 35 g of a ceramic mixture (A) having the composition reporting below were prepared:

(a) 89.9 vol. % $ZrB_2$ (H. C. Starck, grade B, particle size 0.5-6 μm);

(b) 10.0 vol. % SiC (H. C. Starck, grade UF25, particle size <0.76 μm); and (c) 0.1 vol. % $Y_2O_3$ (H. C. Starck, particle size 0.6-0.9 μm, purity >99.95%);

The ceramic suspension was prepared by mixing in a ball mill the solid raw materials with 35 g of ethyl alcohol for 2 h. Subsequently, short carbon fibres (Nippon Graphite Fiber Corporation, XN-C60-03S) were added, in the proportion of 45% by volume with respect to the solid of the ceramic suspension and about 150 ml of ethyl alcohol. The mixture thus prepared was also mixed in a ball mill for 22 h.

The drying took place using a rotary evaporator at 80° C.

The agglomerates contained in the dry mixture obtained were disaggregated and everything was poured into a steel mould of 30 mm diameter by applying linear pressure of 20 MPa.

The composite material was consolidated by means of hot-pressing at 1900° C. at a pressure of 40 MPa, bringing the sample from 900° C. at 1900° C. in 1 hour, with a dwell time of 30 min. and free descent.

The microstructure of the material was completely dense and without macro-defects, with the non-agglomerated fibres and uniformly distributed in the ceramic phase.

The final density of the consolidated material measured by immersion in distilled water, 3.86 g/cm³, was lower than the theoretical one, equal to 4.16 g/cm³, because of the formation of low-density secondary phases. This aspect leads to advantages in the case of making components intended for flying.

The addition of 0.1 vol. % of $Y_2O_3$ in mixture (A) also reduces the porosity from 11% to 7% with respect to a material made with a mixture of ceramic phases in which component (c) is not present.

Example 3—UHTC Reinforced with Short Fibres 35 g of a ceramic mixture (A) having the composition reporting below were prepared:
- (a) 80 vol. % $ZrB_2$ (H. C. Starck, grade B, particle size 0.5-6 μm);
- (b) 5 vol. % SiC (H. C. Starck, grade UF25, particle size <0.76 μm); and
- (c) 15 vol. % $Y_2O_3$ (H. C. Starck, particle size 0.6-0.9 μm, purity >99.95%).

The reinforced composite UHTC material was prepared as described in example 2.

The microstructure of the material was dense and free from macro-defects, with the non-agglomerated fibres, uniformly distributed in the ceramic phase and with a suitable fibre/matrix interface for the optimal transfer of the load from the matrix to the fibre.

Example 4—UHTC Reinforced with Long Fibres

A ceramic suspension of 100 g was prepared by mixing in a ball mill a mixture (A) of solid raw materials comprising:
- (a) 90 vol. % $ZrB_2$ (H. C. Starck, grade B, particle size 0.5-6 μm);
- (b) 5 vol. % SiC (H. C. Starck, grade UF25, particle size <0.76 μm); and
- (c) 5 vol. % $Sc_2O_3$ (H. C. Starck, particle size 0.6-0.9 μm, purity >99.95%) with 27.7 g of water and additives for 180 min. at 200 rpm.

Two UD preforms made of carbon fibre (Nippon Graphite Fiber Corporation, UF-XN-80-300) with dimensions of 10×10 cm² were infiltrated, laminated, superposed with 0/0° orientation and dried at a temperature of 25° C. and pressure of 101.32 kPa. The infiltrated composite material was consolidated by means of 1 hot-pressing cycle at 1900° C. and a pressure of 40 MPa, with a heating ramp from 900° to 1900° C. in 1 hour, a dwell time of 10 min. and free cooling. The results of the tests performed on the composite UHTC material obtained are reported in the following table.

TABLE 2

| Porosity | vol % | 5.1 ± 1.9 |
|---|---|---|
| Fibre volume | vol % | 34.2 ± 1.4 |
| Flexural strength at amb. T | MPa | 329 ± 11 |

FIG. 2 shows the uniform microstructure of the composite obtained characterized by excellent infiltration of the preform by the ceramic suspension and by a dense matrix.

Example 5—UHTC Reinforced with Long Fibres

A ceramic suspension of 100 g was prepared by mixing in a ball mill a mixture (A) comprising:
- (a) 90 vol. % $ZrB_2$ (H. C. Starck, grade B, particle size 0.5-6 μm);
- (b) 5 vol. % SiC (H. C. Starck, grade UF25, particle size <0.76 μm); and
- (c) 5 vol. % $Y_2O_3$ (H. C. Starck, particle size 0.6-0.9 μm, purity >99.95%) with 27.7 g of water and additives for 180 min. at 200 rpm.

The fibre-reinforced composite UHTC material was prepared as described in example 4 and the results of the tests performed on the UHTC material obtained are as reported in the following table.

TABLE 3

| Porosity | vol % | 1.0 |
|---|---|---|
| Fibre volume | vol % | 50 |
| Flexural strength at amb. T | MPa | 436 ± 20 |
| Flexural strength at 1500° C., Ar | MPa | 709 ± 88 |
| Fracture toughness at amb. T | MPa m^0.5 | 11.43 ± 0.73 |

Figure 3A:
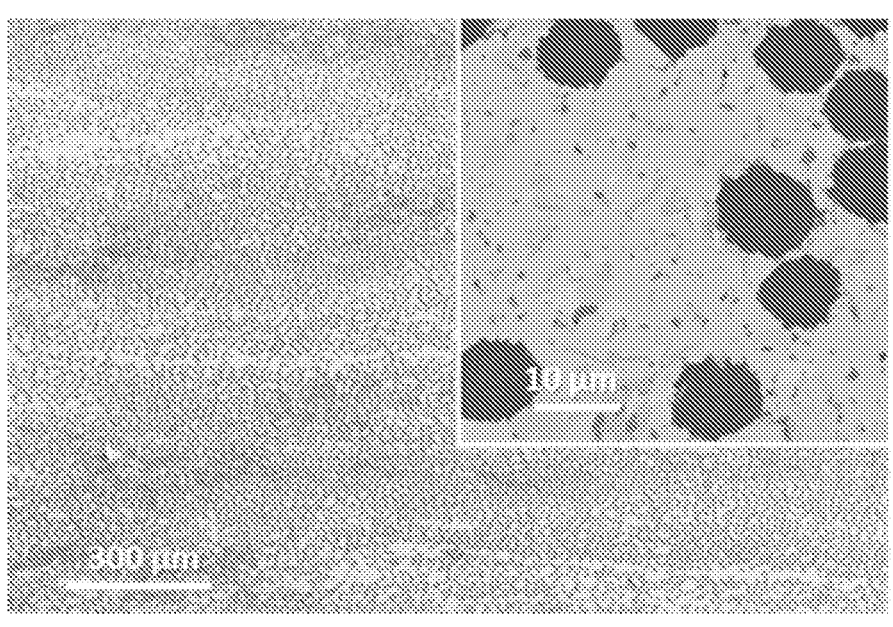
FIG. 3a shows an image under the microscope of the UHTC composite reinforced with long fibres obtained with hand lay-up in example 5 and FIG. 3b shows the image under the microscope of the fracture of the same material.
Figure 3B:
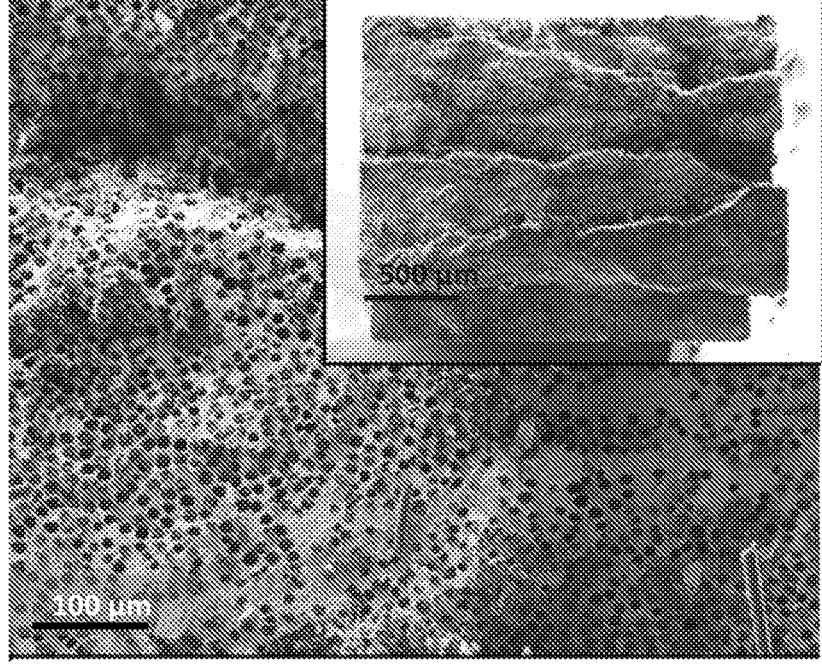

FIG. 3a shows the uniform microstructure of the composite obtained characterized by excellent infiltration of the preform by the ceramic suspension and by a dense matrix. FIG. 3b shows an example of a non-catastrophic fracture of the material and highlights the pull-out of the fibres.

Example 6—UHTC Reinforced with Long Fibres

A ceramic suspension of 100 g was prepared by mixing in a ball mill a mixture (A) comprising:
- (a) 90 vol. % $ZrB_2$ (H. C. Starck, grade B, particle size 0.5-6 μm);
- (b) 5 vol. % SiC (H. C. Starck, grade UF25, particle size <0.76 μm); and
- (c) 5 vol. % $La_2O_3$ (H. C. Starck, particle size 0.6-0.9 μm, purity >99.95%) with 27.7 g of water and additives for 180 min. at 200 rpm.

The fibre-reinforced composite UHTC material was prepared as described in example 4 and the results of the tests performed on the UHTC material obtained are as reported in the following table.

TABLE 4

| Porosity | vol % | 1.4 ± 1.1 |
|---|---|---|
| Fibre volume | vol % | 45.3 ± 3.5 |
| Flexural strength at amb. T | MPa | 409 ± 12 |

Figure 4A:
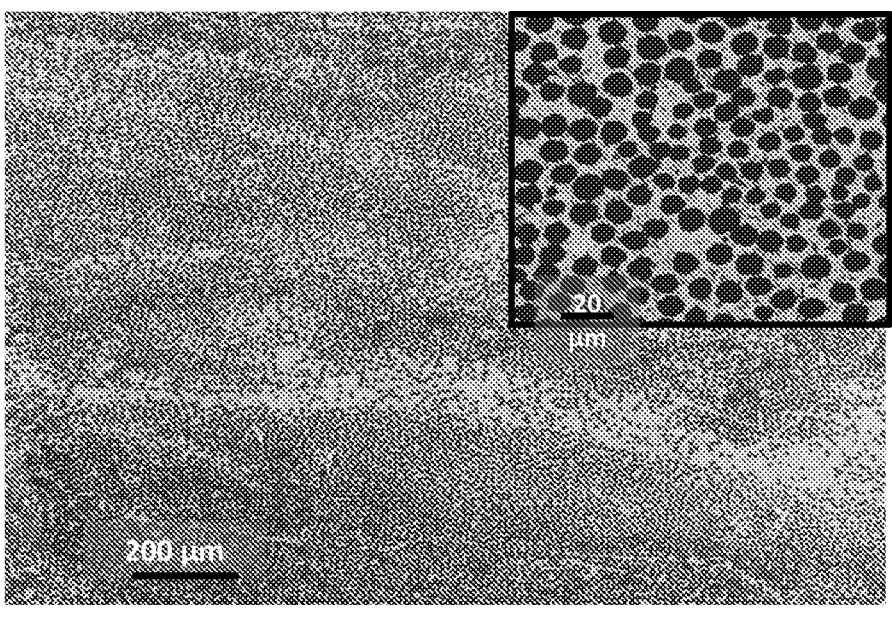
FIG. 4a shows an image under the microscope of the UHTC composite reinforced with long fibres obtained with hand lay-up in example 6 and FIG. 4b shows the image under the microscope of the fracture of the same material.

FIG. 4a shows the uniform microstructure of the composite obtained characterized by excellent infiltration of the preform by the ceramic suspension and by a dense matrix.

Figure 4B:
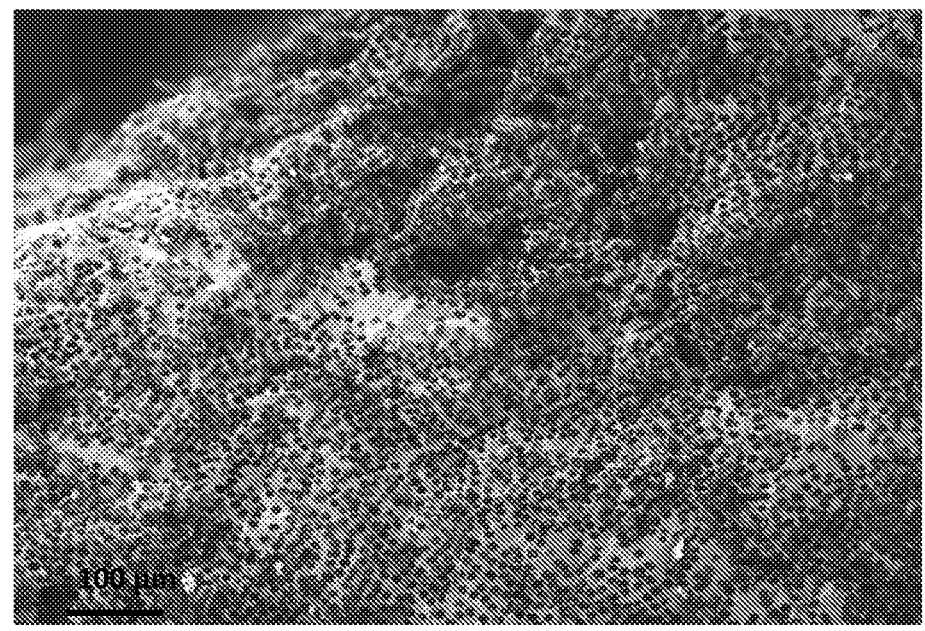

FIG. 4b shows an example of a non-catastrophic fracture of the material and highlights the pull-out of the fibres.

Example 7

A 2000 g ceramic suspension was prepared by mixing in a ball mill the solid raw materials comprising:

- 89.9 vol. % $ZrB_2$ (H. C. Starck, grade B, particle size 0.5-6 μm)
- 10 vol. % SiC (H. C. Starck, grade UF25, particle size <0.76 μm)
- 0.1 vol. % $Y_2O_3$ (H. C. Starck, particle size 0.6-0.9 μm, purity >99.95%) with 666 g of water and additives for 180 min. at 200 rpm.

Figure 5:
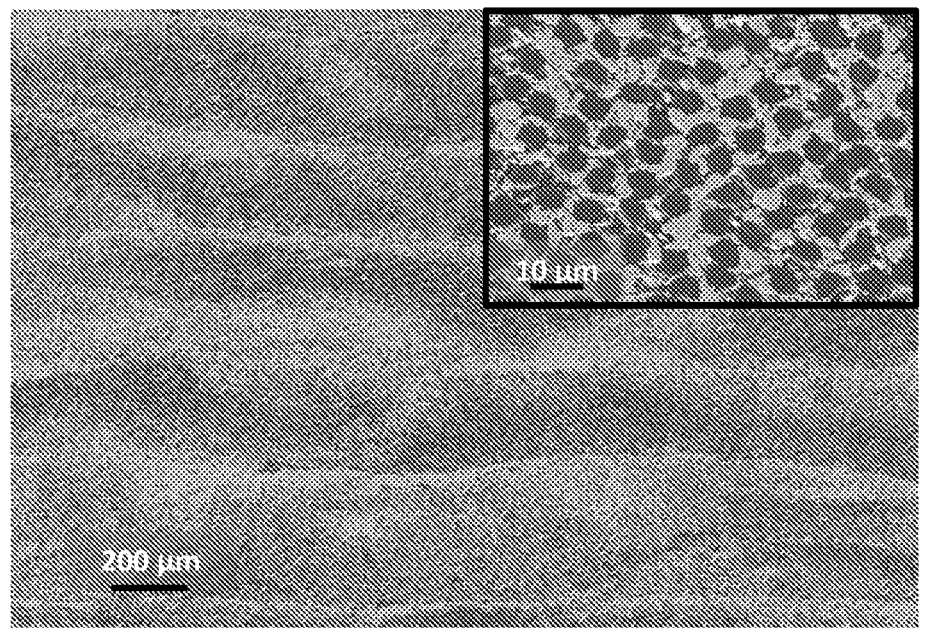
FIG. 5 shows an image under the microscope of the UHTC composite reinforced with long fibres obtained with the filament winding technique described in example 7.

A winding composed of a plurality of carbon fibres (Torayca M40J-12K) was infiltrated using a filament winding apparatus and wound onto a spool. A composite with a hollow cylinder shape with dimensions of 60×40 cm (length×diameter) was produced. The tubular undried composite was cut, spread out and cut again to obtain one-directional planar composites. Once dried in air at a temperature of 25° C. and pressure of 101.32 kPa, the composites were superposed with 0/0° orientation of the fibres and consolidated through 1 hot pressing cycle at 1900° C. at a pressure of 40 MPa, with heating ramp from 900° to 1900° C. in 1 hour, dwell time of 10 min. and free cooling. The microstructure of the material was dense, without macro-defects, with the matrix uniformly distributed around the fibres, as FIG. 5 highlights.

Example 8—UHTC Reinforced with Long Fibres

A ceramic suspension of 100 g was prepared by mixing in a ball mill a mixture (A) comprising:

- (a) 85 vol. % $ZrB_2$ (H. C. Starck, grade B, particle size 0.5-6 μm);
- (b) 10 vol. % SiC (H. C. Starck, grade UF25, particle size <0.76 μm); and
- (c) 5 vol. % $Y_2O_3$ (H. C. Starck, particle size 0.6-0.9 μm, purity >99.95%) with 33.3 g of water and additives for 180 min. at 200 rpm.

Two UD preforms made of carbon fibre (Nippon Graphite Fiber Corporation, UF-XN-90-300) with dimensions of 10×10 cm² were infiltrated, superposed with 0/0° orientation and vacuum dried at the pressure of 2 Pa in a vacuum bag at the temperature of 80° C. for 2 hours.

The composite material was consolidated by means of 1 hot-pressing cycle at 1900° C. and a pressure of 40 MPa, with a heating ramp from 900° to 1900° C. in 1 hour, a dwell time of 10 min. and free cooling. The results of the tests performed on the composite UHTC material obtained are reported in the following table 5.

TABLE 5

| Porosity | vol % | <1.0 |
|---|---|---|
| Fibre volume | vol % | 74 |
| Flexural strength at amb. T | MPa | 471 ± 49 |

Figure 6:
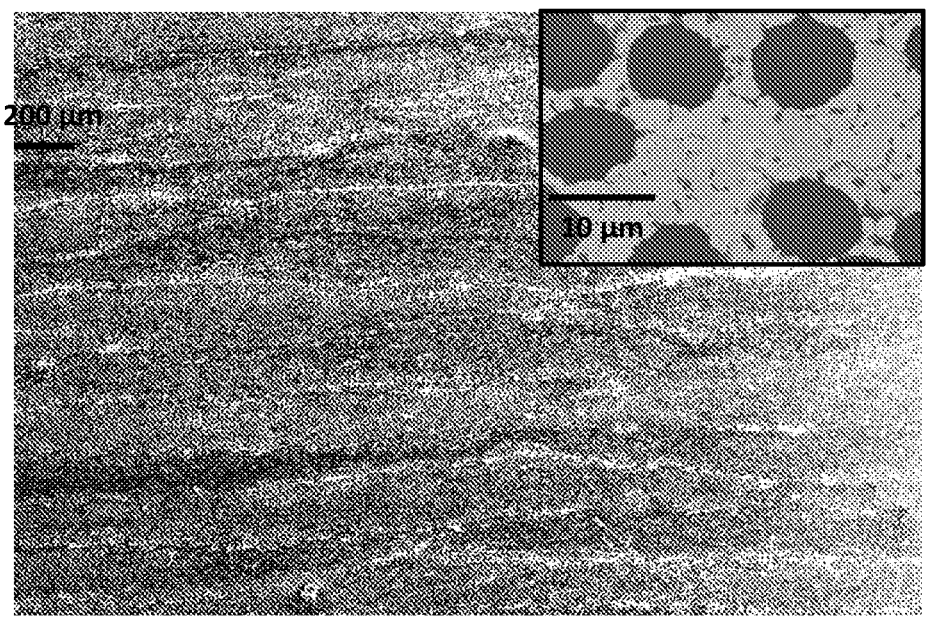
FIG. 6 shows an image under the microscope of the UHTC composite reinforced with long fibres obtained with hand lay-up and vacuum bag, described in example 8.

FIG. 6 shows the uniform microstructure of the composite obtained characterized by a high quantity of fibre, excellent infiltration of the preform by the ceramic suspension and by a dense matrix.

Example 9—UHTC Reinforced with Long Fibres

Realisation of complex forms with UHTC composites reinforced with long fibres.

Figures 7A, 7B, 7C:
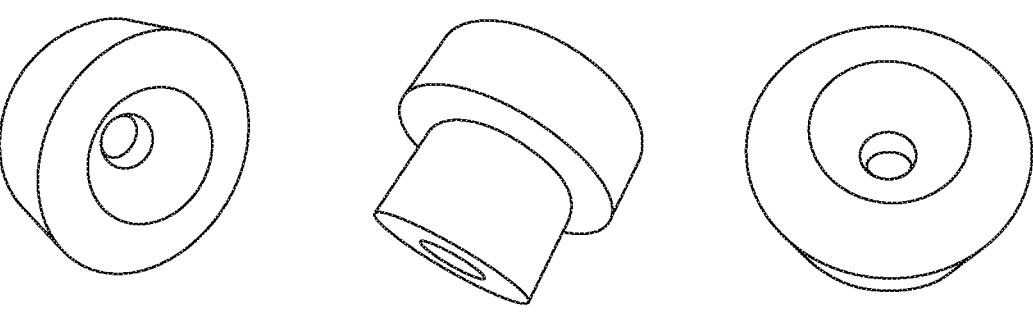
FIGS. 7a, 7b, and 7c illustrate an item made with the UHTC composite reinforced with long fibres described in example 9
Figure 7D:
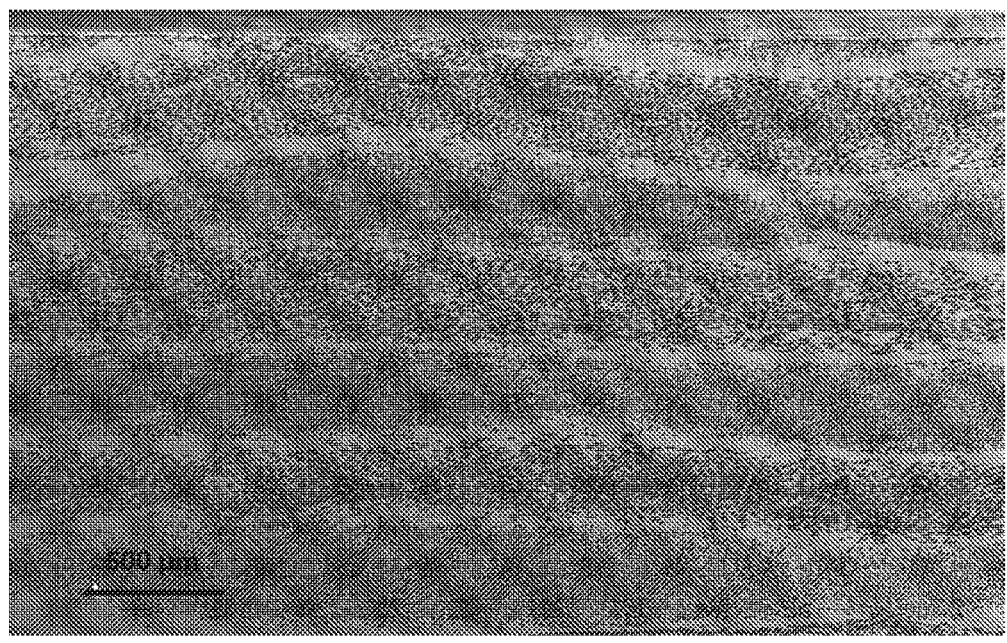
FIG. 7d shows the image under the microscope of the fracture of the same material.

Using the ceramic suspensions, the UD fabrics of carbon fibres and the infiltration procedures described in examples 5, 7 and 8 composite materials were obtained with the fibres of each preform alternating by 90° with respect to the orientation of the fibres of the immediately previous preform (0/90 configuration). For the mechanical processing of the consolidated composites complex forms such as rocket grooves or nozzles illustrated in FIGS. 7a-c were obtained. An example of microstructure of the section with 0/90 fibre configuration is shown in FIG. 7d.

Example 10—UHTC Reinforced with Long Fibres

Realisation of a joint between 2 UHTC materials with long fibres. A ceramic suspension of 150 g was prepared by mixing in a ball mill a mixture (A) comprising:

- (a) 85 vol. % $ZrB_2$ (H. C. Starck, grade B, particle size 0.5-6 μm);
- (b) 10 vol. % SiC (H. C. Starck, grade UF25, particle size <0.76 μm); and
- (c) 5 vol. % $Y_2O_3$ (H. C. Starck, particle size 0.6-0.9 μm, purity >99.95%) with 50 g of water and additives for 180 min. at 200 rpm.

Eight UD preforms made of carbon fibres (Nippon Graphite Fiber Corporation, UF-XN-90-300) having dimensions of 5×5 cm2 were infiltrated. After being dried in air at ambient temperature the composites were superposed in order to obtain two samples with 0/90° fibre orientation.

Each sample was consolidated by means of a first hot-pressing cycle at 1700° C. and a pressure of 40 MPa, with a heating ramp from 900° to 1700° C. in 1 hour, a dwell time of 15 min. and free cooling. The composites resulting from this first hot pressing cycle were superposed and consolidated by means of a second hot-pressing cycle at 1900° C. and a pressure of 40 MPa, with a heating ramp from 900° to 1900° C. in 1 hour, a dwell time of 15 min. and free cooling.

Figure 8:
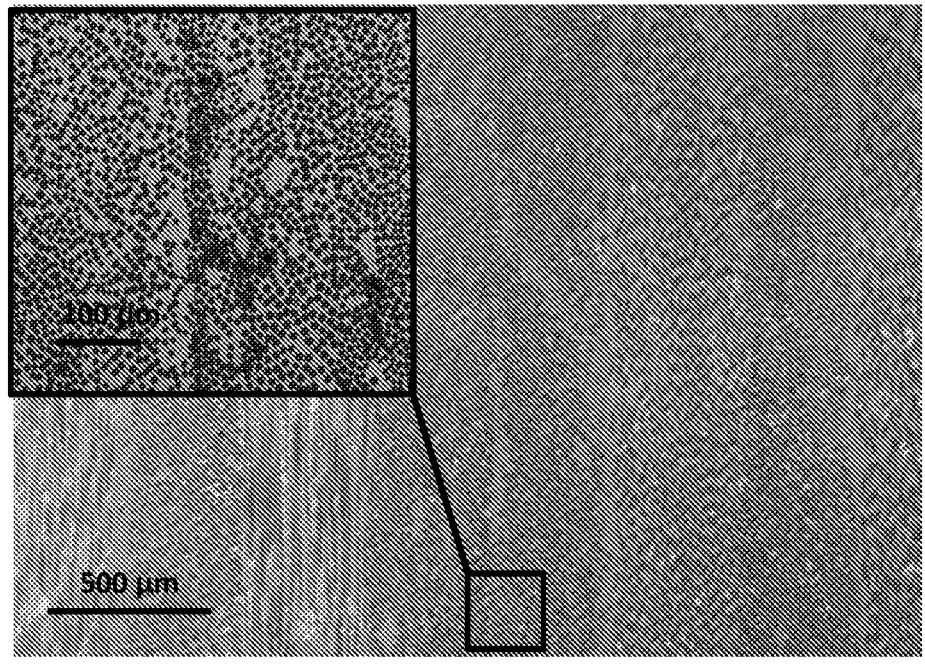
FIG. 8 shows an image under the microscope of the UHTC composite reinforced with long fibres obtained by means of a partial consolidation cycle, superposition of two items and final consolidation for joining the two items in a single object, as described in example 10.

An example of microstructure of the section of the sample obtained at the end of the second pressing cycle in the joining zone between the composites is shown in FIG. 8.

Comparative Example 11 and Examples 12-13—UHTCs Reinforced with Short Fibres

The UHTC composites reinforced with short fibres having the composition shown in table 6 were prepared as described in example 1.

The composite was sintered in a hot press at 1900° C. at a pressure of 40 MPa, bringing the sample from 900° C. at 1900° C. in 1 hour, with a dwell time of 30 min. and free descent. Table 7 shows the physical/mechanical characteristics of the sintered material.

TABLE 6

| | | Comp. example 11 | Example 12 | Example 13 |
|---|---|---|---|---|
| $ZrB_2$ | (vol. %) | 90 | 90 | 90 |
| SiC | (vol. %) | 10 | 5 | 5 |
| $Y_2O_3$ | (vol. %) | / | 5 | 5 |
| Fibre* | (vol. %) | 45 | 45 | 60 |

*short carbon fibres (Nippon Graphite Fiber Corporation, XN-C60-03S).

TABLE 7

| | Porosity (vol. %) | σRT (MPa) | σ1500° C. (MPa) | $K_{Ic}$RT (MPa m$^{0.5}$) | $K_{Ic}$1500° C. (MPa m$^{0.5}$) |
|---|---|---|---|---|---|
| Comp. example 11 | 10 | 129 ± 3 | 219 ± 23 | 4.32 ± 0.27 | 6.09 ± 0.17 |
| Example 12 | <1 | 147 ± 5 | 218 ± 35 | 3.90 ± 0.04 | 6.60 ± 0.69 |
| Example 13 | <1 | 154 ± 4 | 241 ± 45 | 4.68 ± 0.11 | 6.62 ± 0.75 |

The addition of $Y_2O_3$ allows the porosity to be completely eliminated in the same sintering conditions (comparative example 11 and example 12) and comparable or superior mechanical properties to be obtained.

Furthermore, this effect of $Y_2O_3$ on the matrix implies the possibility of introducing a larger volumetric fraction of fibre into the composite, so as to obtain a just as dense material, with improved mechanical properties and significantly lighter.

Comparison Example 14 and Example 15—UHTCs Reinforced with Short Fibres

The UHTC composites reinforced with short fibres having the following composition:

Comparison Example 14: (90 vol. % $ZrB_2$+10 vol. % SiC)+40 vol. % fibre

Example 15: (90 vol. % $ZrB_2$+5 vol. % SiC+5 vol. % $Y_2O_3$)+40 vol. % fibre

The fibres used are short carbon fibres XN-C60-03S, Nippon Graphite Fiber Corp. and were prepared as described in example 1.

The composite was sintered in a hot press at 1900° C. at a pressure of 40 MPa, bringing the sample from 900° C. at 1900° C. in 1 hour, with a dwell time of 30 min. and free descent. The sintered samples were tested in an oxyacetylene torch (OAT) reaching a surface temperature of 2000° C. for 60 sec. Table 8 shows the properties of the materials.

TABLE 8

| | σ after OAT (MPa) | Δm (mg/cm$^2$) | Thickness Oxide (μm) |
|---|---|---|---|
| Es. comp. 14 | 130 ± 2 | −0.79 | 100 |
| Example 15 | 162 ± 9 | 0.69 | 50 |

Comparative Examples 16-17 and Examples 18-19 According to the Invention—UHTCs Reinforced with Long Fibres UHTC composites reinforced with long fibres were prepared having the following composition:

Comparison Example 16: (89 vol. % $ZrB_2$+3 vol. % SiC+8 vol. % $Si_3N_4$)+45 vol. % fibre;

Comparison Example 17: (90 vol. % $ZrB_2$+10 vol. % SiC)+44 vol. % fibre;

Example 18: (85 vol. % $ZrB_2$+10 vol. % SiC+5 vol. % $Y_2O_3$)+55 vol. % fibre;

Example 19: (90 vol. % $ZrB_2$+5 vol. % SiC+5 vol. % $Y_2O_3$)+50 vol. % fibre.

As fibre UD preforms made of carbon fibre UF-XN-90-300, Nippon Graphite Fiber Corp. were used with dimensions of 10×10 cm$^2$, superposed with 0/0° orientation.

The preforms were infiltrated manually with the vacuum bagging technique (2 Pa, temp. 80° C. for 2 hours).

The composite was consolidated by means of a hot-pressing cycle at 1900° C. for 15 minutes, under a pressure of 40 MPa, with a heating ramp from 900° to 1900° C. in 1 hour and free cooling. The results of the tests performed on the composite UHTC material obtained are reported in the following table 9.

TABLE 9

| | Density (g/cm$^3$) | Porosity (vol. %) | σRT (MPa) | σ1500° C. (MPa) | $K_{Ic}$RT (MPa m$^{0.5}$) | Shear stress (MPa) |
|---|---|---|---|---|---|---|
| Comp. example 16 | 3.70 | 11.0 | 337 ± 16 | 547 ± 83 | 9.60 ± 0.74 | 34.0 ± 1.6 |
| Comp. example 17 | 3.55 | 5.4 | 255 ± 24 | 441 ± 32 | 8.70 ± 0.40 | 26.0 ± 2.0 |
| Example 18 | 3.62 | 1.4 | 438 ± 19 | 614 ± 92 | 19.30 ± 3.00 | 44.5 ± 2.0 |
| Example 19 | 4.00 | 1.0 | 436 ± 20 | 709 ± 88 | 11.43 ± 0.73 | 43.9 ± 2.0 |

The table shows a significant improvement in the mechanical properties of the composite of examples 18 and 19, both at ambient temperature and at 1500° C. with respect to the composite of the comparative example 16, where the sintering additive is $Si_3N_4$. Furthermore, the material of comparative example 17, which does not contain sintering additives, shows inferior mechanical properties.

The invention claimed is:

1. A process for preparing a composite, ultra-refractory, fibre-reinforced ceramic material (UHTC) comprising:
    (i) infiltrating a plurality of fibres selected from carbon fibres, silicon carbide fibres and combinations thereof, wherein said plurality of fibres are covered by a protective carbon coating, with a ceramic suspension, thereby obtaining an infiltrated composite material, and drying the infiltrated composite material, wherein the ceramic suspension comprises:
    (A) a mixture of solid ceramic phases comprising:
    (a) an amount greater than or equal to 55 vol. % of an ultra-refractory ceramic component selected from the group consisting of $ZrB_2$, $HfB_2$, $TaB_2$, $TiB_2$, $NbB_2$, ZrC, HfC, TiC, NbC, TaC and mixtures thereof;
    (b) 0-30 vol. % of SiC;
    (c) 0.1-15 vol. % of a scandium compound; and
    (B) a dispersant selected from the group consisting of water, organic solvents, liquid organic precursors of SiC, liquid organic precursors of carbon and mixtures thereof;
    (ii) consolidating the dried composite material at a temperature comprised in the range 1400°-2000° C., wherein the ultra-refractory, fibre-reinforced ceramic material UHTC so obtained is characterized by a density less than or equal to 4 g/cm$^3$, and/or a fracture toughness greater than or equal to 4 MPa·m$^{1/2}$.

2. The process according to claim 1, wherein the fibres are carbon fibres.

3. The process according to claim 1, wherein the ceramic suspension comprises:

(A) the mixture of solid ceramic phases comprising:

(a) 55-96 vol. %, of an ultra-refractory ceramic component selected from the group consisting of $ZrB_2$, $HfB_2$, $TaB_2$, $TiB_2$, $NbB_2$, ZrC, HfC, TiC, NbC, TaC and mixtures thereof;

(b) 2-30 vol. % of SiC;

(c) 0.1-15 vol. % of a scandium compound; and (B) the dispersant selected from the group consisting of water, organic solvents, liquid organic precursors of SiC, liquid organic precursors of carbon and mixtures thereof.

4. The process according to claim 1, wherein the dispersant (B) is water.

5. The process according to claim 1, wherein the mixture (A) of solid ceramic phases comprises SiC having particle size of less than or equal to 500 nm.

6. The process according to claim 1, wherein the ceramic suspension comprises:

(A) the mixture of solid ceramic phases comprising:

(a) 85-98 vol. % of an ultra-refractory ceramic component selected from the group consisting of $ZrB_2$, $HfB_2$, $TaB_2$, $TiB_2$, $NbB_2$, ZrC, HfC, TiC, NbC, TaC and mixtures thereof; and (c) 2-15 vol. % of a scandium compound; and (B) the dispersant selected from the group consisting of liquid organic precursors of SiC, liquid organic precursors of carbon and mixtures thereof.

7. The process according to claim 1, wherein the ultra-refractory ceramic component (a) is selected from the group consisting of $ZrB_2$, $HfB_2$, $TaB_2$, ZrC, HfC, TaC and mixtures thereof.

8. The process according to claim 7, wherein the ultra-refractory ceramic component (a) is $ZrB_2$.

9. The process according to claim 1, wherein the component (c) of the mixture (A) is selected from the group consisting of oxides, borides, borates and hydrides of scandium.

10. The process according to claim 1, wherein the mixture (A) comprises 2-15 vol. % of the component (c).

11. The process according to claim 1, wherein the mixture (A) of solid ceramic phases further comprises 1-20 vol. % of a functionalizing agent (d) selected from the group consisting of borides, carbides and silicides of at least one element selected from the group consisting of W, Re, Ir, Mo, Cr and mixtures thereof.

12. The process according to claim 1, wherein the ceramic suspension comprises 20-50 vol. % of mixture (A) of solid ceramic phases and 50-80 vol. % of the dispersant selected from the group consisting of water, organic solvents, liquid organic precursors of SiC, liquid organic precursors of carbon and mixtures thereof (B), wherein the volumetric amounts of (A) and (B) refer to the total volume (A)+ (B).

13. A process for obtaining UHTC composites reinforced with short fibres, said process comprising:

(i.a1) dispersing a plurality of fibres having a length of about 25-6000 μm, wherein said plurality of fibres are covered by a protective carbon coating, in a ceramic suspension and grinding the dispersion, obtaining an infiltrated composite material; and (i.b1) shaping and drying the infiltrated composite material with a shaping method selected from the group consisting of spray application, slip casting, tape casting and pressing, wherein the ceramic suspension comprises (A) a mixture of solid ceramic phases comprising:

(a) an amount greater than or equal to 55 vol. % of an ultra-refractory ceramic component selected from the group consisting of $ZrB_2$, $HfB_2$, $TaB_2$, $TiB_2$, $NbB_2$, ZrC, HfC, TiC, NbC, TaC and mixtures thereof;

(b) 0-30 vol. % of SiC;

(c) 0.1-15 vol. % of a scandium compound; and (B) a dispersant selected from the group consisting of water, organic solvents, liquid organic precursors of SiC, liquid organic precursors of carbon and mixtures thereof;

(ii) consolidating the dried composite material at a temperature comprised in the range 1400°-2000° C., wherein said UHTC composites reinforced with short fibres are characterized by flexural strength at 25°±2° C. greater than 150 MPa;

flexural strength at 1500° C. in a reducing atmosphere greater than 200 MPa; and thermal shock resistance greater than 1000° C.

14. A process for obtaining UHTC composites reinforced with long fibres, said process comprising:

(i.a2) infiltrating at least one preform comprising a plurality of fibres having a length that is greater than 6000 μm, wherein said plurality of fibres are covered by a protective carbon coating, with a ceramic suspension with a method selected from hand lay-up, dip coating and filament winding, obtaining an infiltrated composite material; and (i.b2) drying the infiltrated composite material, wherein the ceramic suspension comprises (A) a mixture of solid ceramic phases comprising:

(a) an amount greater than or equal to 55 vol. % of an ultra-refractory ceramic component selected from the group consisting of $ZrB_2$, $HfB_2$, $TaB_2$, $TiB_2$, $NbB_2$, ZrC, HfC, TiC, NbC, TaC and mixtures thereof;

(b) 0-30 vol. % of SiC;

(c) 0.1-15 vol. % of a scandium compound; and (B) a dispersant selected from the group consisting of water, organic solvents, liquid organic precursors of SiC, liquid organic precursors of carbon and mixtures thereof;

(ii) consolidating the dried composite material at a temperature comprised in the range 1400°-2000° C., wherein said UHTC composites reinforced with long fibres are characterized by flexural strength at 25°±2° C. greater than 400 MPa for composite with 0°/0° orientations of the preforms;

flexural strength at 1500° C. in reducing atmosphere greater than 500 MPa for composites with 0°/0° orientations of the preforms; and thermal shock resistance greater than 1000° C. for composite with 0°/0° orientations or 0°/90° orientations of the preforms.

15. The process according to claim 14, wherein the step (i.a2) comprises the hand lay-up of at least one preform selected from the group consisting of UD preforms, interwoven 2D preforms, random 2D preforms, 2.5D preforms and 3D preforms and combinations thereof.

16. The process according to claim 14, wherein the step (i.a2) and/or the step (i.b2) comprises superimposing the infiltrated composite material.

17. The process according to claim 14, wherein the step (i.a2) comprises immersing at least one preform having a substantially linear extension in a bath comprising the ceramic suspension.

* * * * *